United States Patent
Yu et al.

(10) Patent No.: US 7,526,584 B2
(45) Date of Patent: Apr. 28, 2009

(54) METHOD FOR SETTING UP A SERIAL COMMUNICATION PORT CONFIGURATION

(75) Inventors: Cheng-Ping Yu, Chungho (TW); Hung-Chi Lin, Chungho (TW)

(73) Assignee: Evalue Technology Inc., Chungho (TW)

( * ) Notice: Subject to any disclaimer, the term of this patent is extended or adjusted under 35 U.S.C. 154(b) by 187 days.

(21) Appl. No.: 11/535,070

(22) Filed: Sep. 26, 2006

(65) Prior Publication Data

US 2008/0122480 A1    May 29, 2008

(51) Int. Cl.
*G06F 3/00* (2006.01)
*G06F 13/12* (2006.01)
*G06F 15/177* (2006.01)

(52) U.S. Cl. .............................. 710/62; 710/8; 709/220
(58) Field of Classification Search .................. 710/62, 710/8; 709/220
See application file for complete search history.

(56) References Cited

U.S. PATENT DOCUMENTS

2007/0293258 A1 * 12/2007 Gollnick et al. ............. 455/517

* cited by examiner

*Primary Examiner*—Niketa I Patel
(74) *Attorney, Agent, or Firm*—Bacon & Thomas, PLLC

(57) ABSTRACT

A method for setting up a serial communication port configuration is disclosed. The method comprises a hardware circuit of a motherboard having a plurality of digital logic gates and a plurality of chips disposed thereon, wherein a process is initiated when the digital logic gates receive a high or low electric potential signal inputted by a general programmable input/output (GPIO), and the processed high or low electric potential signal is transmitted to the chips for further processing and outputting the same to execute setting up of the serial communication port configuration.

3 Claims, 3 Drawing Sheets

| GPIO : | SW485R | SW232R | SW422RT |
|---|---|---|---|
| Serial communication port RS232 : | LO | HI | HI |
| Serial communication port RS422 : | LO | LO | LO |
| Serial communication port RS485 : | HI | LO | HI |

*FIG. 2*

METHOD FOR SETTING UP A SERIAL COMMUNICATION PORT CONFIGURATION

BACKGROUND OF THE INVENTION

1. Field of the Invention

The present invention relates to a method for setting up a serial communication port configuration, and more particularly to a BIOS (basic input/output system) is used for combining digital logic gates with a software to enable a user to setup the configuration in a booting displaying page easily and change the RS-232/422/485 serial communication port configuration as desired.

2. Description of Related Art

The industrial personal computer (IPC) in the earlier days was adopted for automation of the machine and the equipment. Along with the progressive development in the semiconductor process and the microprocessor technologies, integrated chips have substantially improved and upgraded the personal computer performance with a better processing capability, faster speed and multi-functionalities. The computer system, which was initially adopted for personal use has become multifunctional after combining with the functions of the software, the hardware, the peripheral components and the developing tools, even has been extended to the industrial application.

Furthermore, the well-developed technology allows the companies to take care of a larger quantity of the information in an auto control room or in separate equipments, for example, the computers, the automatic teller machine (ATM), the call center and the Internet servers, and also for the industrial use. The definition for the IPC has shifted from the industrial automation to the digital control, and paving way towards the Internet appliance (IA). The available network attached storage (NAS) product has been developed accordingly for example. The Internet storage device will become more and more essential when the global fiber width band and the main network are ready.

However, the computer communication application is increasing and the information transmission traffic overloads load the host server. The only solution is to use the smart serial communication ports to setup the configurations to share the load of the host. When the hardware engineer handles the remote device (IPC) via various serial communication ports, for example, RS-232/422/485, for setting up the configurations, the engineer must send someone or himself to open the housing and reach in to the internal electronic device for completing the settings. Such manual setting procedure not only consumes a lot of time and increases the cost, but also the engineer cannot process setting up the functions anytime and the procedure is obviously more complicated. As long as the IPC has the need of improvement, the manufacturers in the field have the responsibility to work on it.

Furthermore, setting up the above electronic hardware usually requires lots of wires to support, which are the defects of the conventional products, for example.

1. A large number of wires are required to support the set up process, and accordingly the related electronic components cannot be reduced. Thus, both the cost and the layout on the motherboard are substantially increased.

2. The housing has to be opened to setup the internal electronic hardware, and the operation time for setting up cannot be shortened.

3. The setup must be implemented through the hardware, and therefore this cannot fit various types of the chips.

Therefore, how to overcome the above defects of the conventional art is an important issue for the manufacturers in the field.

SUMMARY OF THE INVENTION

According to an aspect of the present invention, a BIOS (basic input/output system) may be used for combining digital logic gates with a software to allow a user, for example, a hardware engineer, to execute a CMOS setup in a BIOS, a DOS or a windows operation system for setting up a configuration. Thus, the RS-232/422/485 serial communication port configuration may be easily changed.

Accordingly, the present invention has at least the following advantages.

1. The number of the components and the cost may be effectively reduced. Accordingly, the layout space on the motherboard may be effectively reduced.

2. The opening of the housing to change the internal electronic hardware for setting up may be effectively avoided.

3. Because the software is used for setting up, therefore a variety of chips may be used.

BRIEF DESCRIPTION OF THE DRAWING

FIG. 2 is a truth table of an electric potential of a general programmable input/output (GPIO) and a serial communication port configuration according to a preferred embodiment of the present invention.

DETAIL DESCRIPTION OF THE INVENTION

The present invention is directed to a method for setting up a serial communication port configuration. Particularly, a plurality of digital logic gates, for example the NAND digital logic gates, and a plurality of chips are disposed on a hardware circuit of the motherboard. When the digital logic gates are electronically connected to general programmable input/output (GPIO) and receive high or a low electric potential signal inputted by the GPIO, a procedure is initiated to process the high or low electric potential signal and then transmit the processed high or lower electric potential signal to the chips for further processing and then outputting the same to execute the setting up of the functional configuration to change the serial communication port configuration of RS-232/422/485.

Figure 1:
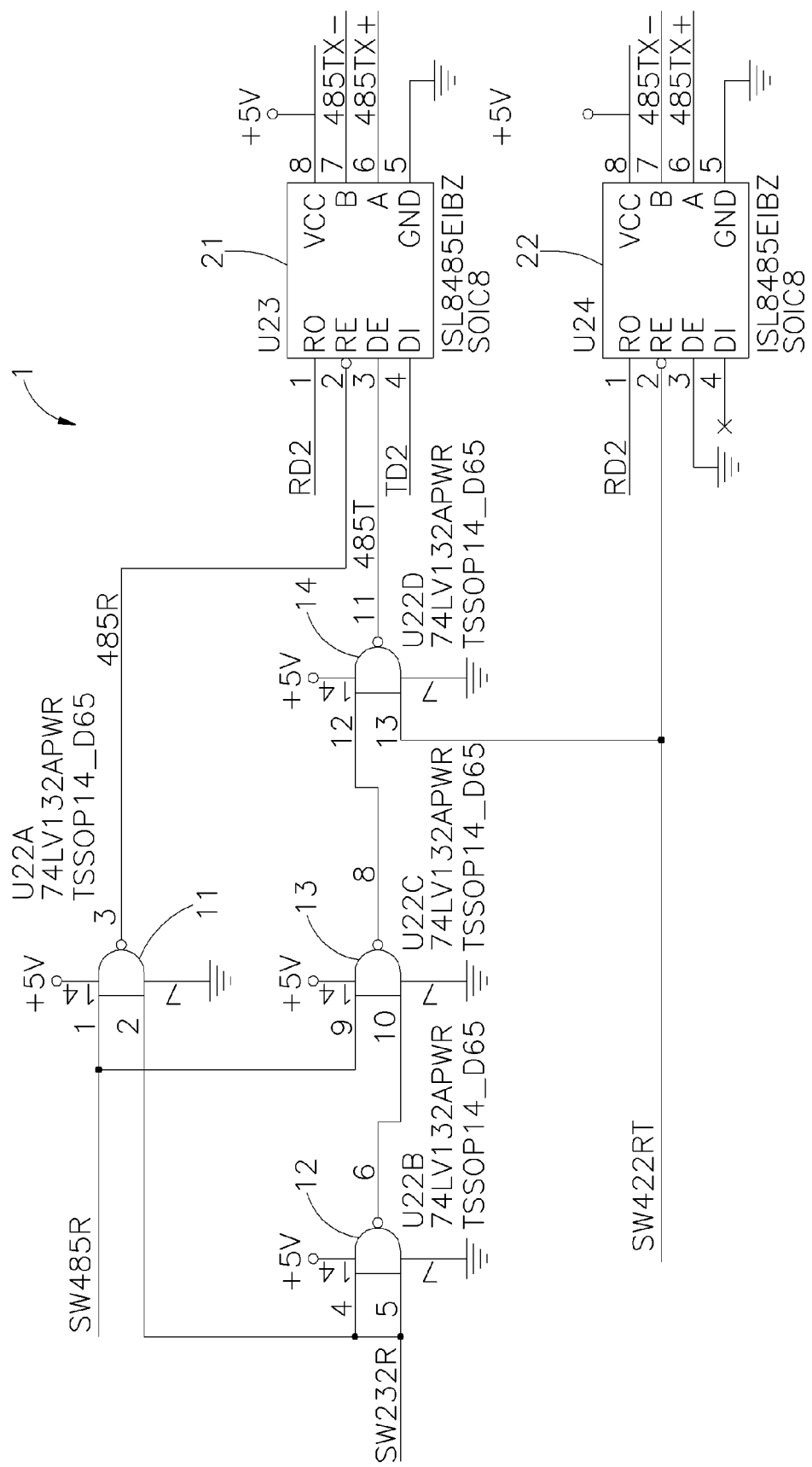
FIG. 1 is a diagram of a hardware circuit according to a preferred embodiment according of the present invention.

Referring to FIG. 1, a hardware circuit 1 of a motherboard of the present invention comprises a first NAND digital logic gate 11, a second NAND digital logic gate 12, a third NAND digital logic gate 13 and a fourth NAND digital logic gate 14, and a first chip 21 and a second chip 22. A GPIO SW485R is respectively electrically connected to the first NAND digital logic gate 11 and the third NAND digital logic gate 13. A GPIO SW232R is respectively electrically connected to the first NAND digital logic gate 11 and the second NAND digital logic gate 12. A GPIO SW422RT is respectively electrically connected to the fourth NAND digital logic gate 14 and the second chip 22. The first NAND logic gate 11 is electrically connected to the first chip 21. The second NAND logic gate 12 is electrically connected to the third NAND digital logic gate 13. The third NAND logic gate 13 is electrically connected to the fourth NAND digital logic gate 14. The fourth NAND logic gate 14 is electrically connected to the first chip 21.

Referring to FIGS. 1 and 2, a user, for example, a hardware engineer, may initialize a COMS Setup in a BIOS (basic input/output system), a DOS or a windows to input a low electric potential signal (LO) from the GPIO SW485R, a high electric potential signal (HI) from the GPIO SW232R and a high electric potential signal (HI) from the GPIO SW422RT. After processing the signals by the first NAND digital logic gate 11, the second NAND digital logic gate 12, the third NAND digital logic gate 13 and the fourth NAND digital logic gate 14 on the hardware circuit 1, and the first chip 21 and the second chip 22, the output signals can execute the setting up of the RS-232 serial communication port configuration.

Furthermore, when inputting the low electric potential signal (LO) from the GPIO SW485R, the low electric potential signal (LO) from the GPIO SW232R and the low electric potential signal (LO) from the GPIO SW422RT, as shown in FIG. 2, and after processing the signals by the first NAND digital logic gate 11, the second NAND digital logic gate 12, the third NAND digital logic gate 13 and the fourth NAND digital logic gate 14 on the hardware circuit 1, and the first chip 21 and the second chip 22, the output signals can execute the setting up of the RS-422 serial communication port configuration.

Additionally, when inputting the high electric potential signal (HI) from the GPIO SW485R, the low electric potential signal (LO) from the GPIO SW232R and the high electric potential signal (HI) from the GPIO SW422RT, as shown in FIG. 2, and after processing the signals by the first NAND digital logic gate 11, the second NAND digital logic gate 12, the third NAND digital logic gate 13 and the fourth NAND digital logic gate 14 on the hardware circuit 1, and the first chip 21 and the second chip 22, the output signals can execute the setting up of RS-485 serial communication port configuration.

Accordingly, the user is merely required to initialize the COMS Setup in the BIOS, the DOS or the windows to input the high electric potential signal (HI) or the low electric potential signal (LO) from the GPIO SW485R, the GPIO SW232R or the GPIO SW422RT, as shown in FIG. 2, then the first NAND digital logic gate 11, the second NAND digital logic gate 12, the third NAND digital logic gate 13 and the fourth NAND digital logic gate 14 on the hardware circuit 1, and the first chip 21 and the second chip 22 start to process the signals to change the RS-232/422/485 serial communication port configuration. Accordingly, the housing of the industrial computer need not be opened to change the setting of the internal electronic components for setting up of the serial communication port configuration. Thus, the present invention can reduce the number of electronic components and the overall cost, and correspondingly increase the layout space utilization. Thus, the operation time for switching configuration may be effectively reduced and a variety of chips may be used.

Figure 3:
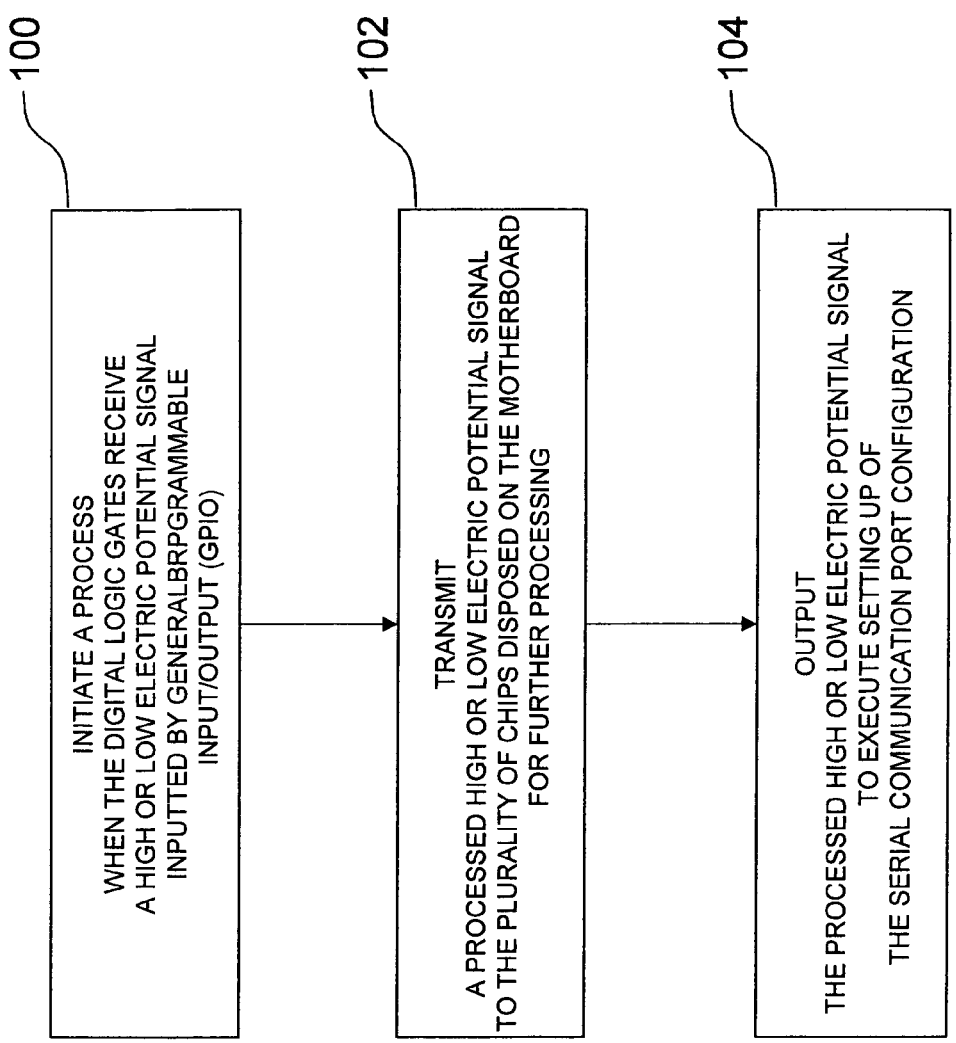
FIG. 3 is a flow chart of a method for setting up a serial port configuration.

To summarize a method for setting up a serial communication port configuration, wherein the serial communication port configuration comprises a hardware circuit of a motherboard having a plurality of digital logic gates and a plurality of chips disposed thereon, with reference to FIG. 3, in a first step a process is initiated when the digital logic gates receive a high or low electric potential signal inputted by general programmable input/output (GPIO) (step 100). A processed high or low electric potential signal is transmitted to the chips for further processing (step 102), and is then output to execute setting up of the serial communication port configuration (step 104).

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. A method for setting up a serial communication port configuration, the serial communication port configuration comprising a hardware circuit of a motherboard having a plurality of digital logic gates and a plurality of chips disposed thereon, said method comprising steps of:

initiating a process when said digital logic gates receive a high or low electric potential signal inputted by general programmable input/output (GPIO), and transmitting a processed high or low electric potential signal to said chips for further processing and out-putting the same to execute setting up of the serial communication port configuration;

wherein said digital logic gates comprise a first digital logic gate, a second digital logic gate, a third digital logic gate and a fourth digital logic gate; said chips comprise a first chip and a second chip; a GPIO RS-485 port is respectively electrically connected to said first digital logic gate and said third digital logic gate; a GPIO RS-232 port is respectively electrically connected to said first digital logic gate and said second digital logic gate; a GPIO RS-422 port is respectively electrically connected to said fourth digital logic gate and said second chip; said first logic gate is electrically connected to said first chip; said second logic gate is electrically connected to said third digital logic gate; said third logic gate is electrically connected to said fourth digital logic gate; said fourth logic gate is electrically connected to said first chip.

2. A method for setting up a serial communication port configuration, the serial communication port configuration comprising a hardware circuit of a motherboard having a plurality of digital logic gates and a plurality of chips disposed thereon, said method comprising steps of:

initiating a process when said digital logic gates receive a high or low electric potential signal inputted by general programmable input/output (GPIO), and transmitting a processed high or low electric potential signal to said chips for further processing and outputting the same to execute setting up of the serial communication port configuration;

wherein a user initializes a CMOS Setup in a BIOS (basic input/output system), a DOS or a windows to input a low electric potential signal (LO) from a GPIO RS-485 port, or a high electric potential signal (HI) from a GPIO RS-232 port or a GPIO RS-422 port to said digital logic gates, and start to process said low electric potential signal (LO) or said high electric potential signal (HI) to output a signal to execute setting of the serial communication port configuration; and wherein said digital logic gates comprise NAND digital logic gates.

3. A method for setting up a serial communication port configuration, the serial communication port configuration comprising a hardware circuit of a motherboard having a plurality of digital logic gates and a plurality of chips disposed thereon, said method comprising steps of:

initiating a process when said digital logic gates receive a high or low electric potential signal inputted by general programmable input/output (GPIO), and transmitting a processed high or low electric potential signal to said chips for further processing and outputting the same to execute setting up of the serial communication port configuration;

wherein a user initializes a CMOS Setup in a BIOS (basic input/output system), a DOS or a windows to input a low electric potential signal (LO) from a GPIO RS-485 port, or a high electric potential signal (HI) from a GPIO RS-232 port or a GPIO RS-422 port to said digital logic gates, and start to process said low electric potential signal (LO) or said high electric potential signal (HI) to output a signal to execute setting of the serial communication port configuration; and wherein said serial communication port configuration comprises RS-232/422/485.

* * * * *